Aug. 19, 1930.  C. SCOTT-SNELL ET AL  1,773,551
THERMALLY ACTUATED MOTIVE DEVICE
Filed June 13, 1927  2 Sheets-Sheet 1

C. Scott-Snell and
E. Scott-Snell
INVENTORS
By: Marks & Clerk
Attys.

Patented Aug. 19, 1930

1,773,551

UNITED STATES PATENT OFFICE

CHARLES SCOTT-SNELL AND EDWARD SCOTT-SNELL, OF BAYSWATER, LONDON, ENGLAND, ASSIGNORS TO VACUUM POWER LIMITED, OF LONDON, ENGLAND.

THERMALLY-ACTUATED MOTIVE DEVICE

Application filed June 13, 1927, Serial No. 198,667, and in Great Britain November 11, 1926.

This invention relates to the production of pressure or velocity head in a fluid by means of heat and has for its object to provide improved methods and means therefor.

The invention is particularly applicable to the delivery of oil under pressure to the vaporizing jet of illuminating or heating apparatus using oil fuel.

According to the present invention advantage is taken of the physical phenomenon that when two or more vessels containing a liquid having each of them a "free surface" in contact with its own vapour are connected the pressure in the whole system is that corresponding to the vapour pressure of the free surface which is subjected to the lowest envelope temperature. That is to say that however much heat is imparted to one of them the pressure in the combination is governed entirely by the temperature of the free surface in the cooler vessel. Now the pressure of a vapour above a free surface in contact with its own liquid is necessarily a definite and different one for each and every temperature of the liquid. For instance at the so-called "boiling point" of the liquid the vapour pressure is 14.7 lb. per square inch absolute, whereas at temperatures above and below this the vapour pressure is above and below atmospheric pressure respectively.

Thus, if one of the free surfaces can be so controlled automatically that its temperature alternates between two values corresponding to two pressures (above and below atmospheric pressure respectively) a ready means is provided for pumping oil against a pressure head in spite of the fact that heat is continuously applied to the other vessel.

Referring to the accompanying diagrammatic drawings:—

Figure 1:
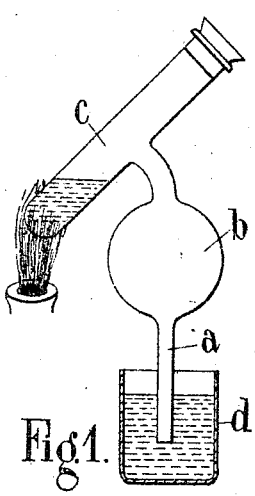
Figure 1 is an explanatory sketch illustrating the main principle underlying the present invention.

One method of effecting this control may be explained with reference to Figure 1 which illustrates a model constructed in glass and comprising a vertical tube $a$ near the upper end of which is a spherical enlargement $b$, said upper end being integrally connected to the middle of an inclined cylindrical glass vessel $c$ closed at both ends.

In operation this apparatus is completely filled with kerosene oil and is supported with the lower end of the stem dipping into a vessel containing such oil. Heat is now applied to the lower end of the inclined vessel $c$.

Vapour will form at the top of the inclined vessel $c$ displacing a corresponding quantity of liquid which passes out into the reservoir $d$ through the lower end of the vertical tube.

This continues until a quantity of the liquid is vaporized, whereupon some of the vapour is driven out by expansion through the lower end of the vertical tube where it is immediately condensed. Consequently cool liquid enters the lower end of the vertical tube $a$, which in turn condenses more of the vapour. As the cool liquid enters, however, the area of its free surface which is exposed to the vapour increases rapidly as the spherical enlargement $b$ is reached and thus the rate of condensation increases rapidly until a stage is reached in which the whole of the vapour is entirely condensed instantaneously, thus producing a powerful and sudden vacuum which causes the whole of the apparatus to be entirely filled with kerosene drawn in from the reservoir.

The inlet pipe $a$ is of somewhat restricted internal area of cross section so that when the pressure within the apparatus drops this drop cannot fully be satisfied by the incoming liquid, consequently a very substantial and cumulative vacuum is formed in front of the liquid column; the volume of liquid entering the stem $a$ per unit of time as expressed by the velocity multiplied by the area of the pipe is very much greater than the volume of vapour which is capable of being generated (by the source of heat) in the same unit of time. Consequently the return of liquid does not cease at its entry into the inclined vessel, but completely floods it as stated above, thus producing conditions analogous to those originally obtaining, viz. a system completely full of liquid, but at a temperature below its normal boiling point.

This cycle of operations continues as long as heat is supplied to the inclined vessel $c$, the outgoing stroke being found in practice to be comparatively slow but the recoil stroke, the moment the free surface spreads to the full area of the spherical enlargement, accelerating to such a speed that the remaining operation of completely filling the system takes a very small fraction of a second, and is certainly much too fast for the eye to follow when glass apparatus has been used in experimental investigation.

Figure 2:
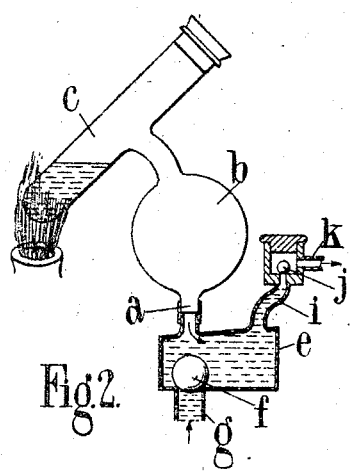
Figure 2 is a modification of Figure 1.

In utilizing this intermittently produced vacuum to apply a positive pressure for any desired purpose, it is convenient as illustrated in Figure 2 to connect the stem to an auxiliary chamber $e$ embodying an inlet non-return valve $f$, the entry to which chamber $c$ is by way of a further stem $g$ communicating with a reservoir (not shown). This auxiliary chamber $e$ embodies also an outlet tube $i$ controlled by a further non-return valve $j$ communicating with the apparatus to which the positive pressure is to be applied, an air vessel being interposed if desired.

The inlet opening $g$ is preferably somewhat bigger than the outlet opening $k$.

The positive pressure is caused by the boiling of the liquid at the stage where only one free surface (this being then the governing one) exists. As soon as the other free surface which is not subjected to extraneous heat is developed the pressure is governed by this secondary temperature. This is of course subject to some heating from the distillation effect and to some cooling of its envelope and when the cooling gains over the heating sufficiently to lower the vapour pressure below that corresponding to atmospheric pressure the reversal, or return flow in the stem $a$ commences.

It has been found experimentally that it is possible to dispense with the outlet valve $j$ provided that the bore of the tube $i$ at the point where the outlet valve would normally be placed is a great deal less than the bore of the inlet valve opening.

In the apparatus so far described the temperature of the free surface effecting condensation is controlled by a purely physical phenomenon, i. e. the dissipation of heat by natural means, but according to the present invention upsetting of a hydrostatic balance is employed to effect the necessary control.

Figure 4:
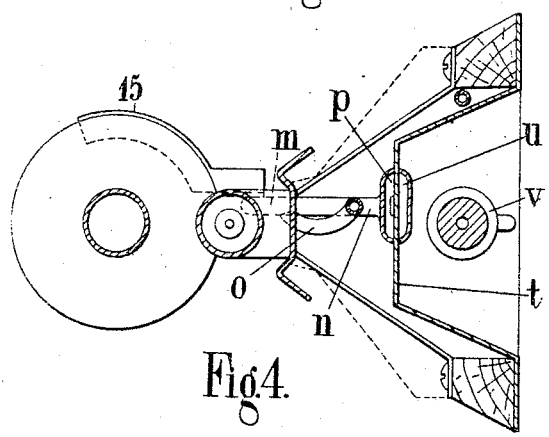
Figure 4 is a sectional plan on the line I—I of Figure 3.
Figure 3:
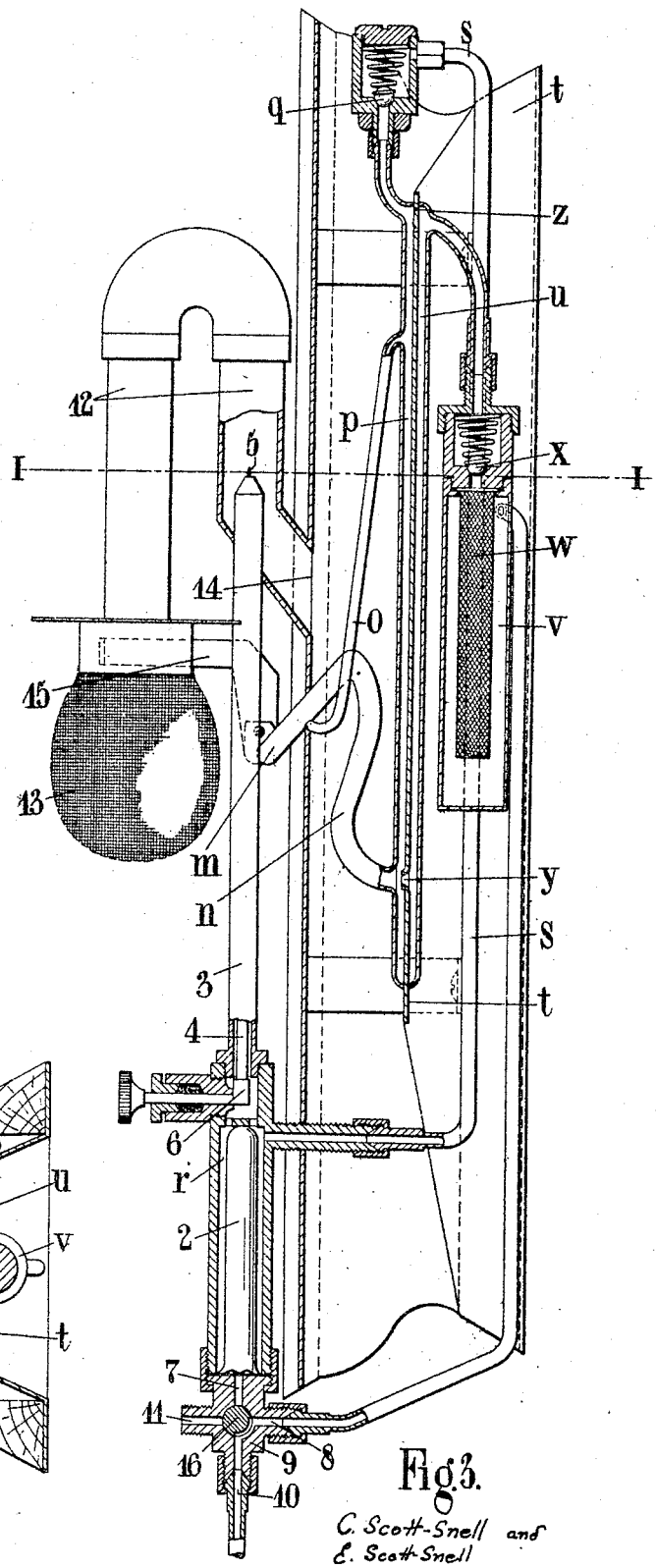
Figure 3 represents in sectional elevation a convenient practical construction of self-feeding pressure oil lamp.

In one manner of operating in accordance with this hydrostatic balance control principle, as illustrated in Figures 3 and 4, a system $m$, $n$, $o$, $p$ is provided, the vertical portion $p$ communicating through a non-return outlet valve $q$ at its upper end with a chamber $r$ by means of a pipe $s$.

A frame plate $t$ forms part of the wall of the conduit $p$ and also part of the wall of a further conduit $u$, the latter communicating with a vessel $v$ containing a filter $w$ by way of a non-return valve $x$. A communicating hole $y$ and a fine air escape hole $z$ as shown in Figure 3 are provided in the plate $t$.

The chamber $r$ contains a tubular member 2 closed at its upper end to act as a pressure buffer air vessel and is connected freely at its upper end to a jet 3 whose nozzle is provided with a tapered needle 5 on a spindle 4 operable by a cam 6. This chamber, as well as the chamber $v$, separately communicates with ducts 7 and 8 respectively in a casting 9. The former duct may be closed (as shown in Figure 3) or may be placed in communication with either duct 11 or duct 8 by means of a cock 16, while the latter duct is in constant communication with the inlet duct 10 which is connected to an oil supply source (not shown). The jet discharges into a mixing chamber 12 from which an inverted mantle 13 is suspended, air entering at 14.

Heat is conducted to the lower end of the inverted U-shaped conduit $m$, $n$, through an arm 15 formed conveniently of copper.

Figures 5–8 illustrate diagrammatically the system $n$, $m$, $o$, $p$ embodied in the construction according to Figures 3 and 4, the lower end of the pipe $p$ being assumed to be in direct communication with an oil reservoir, while the non-return valves $q$ and $x$ and the inlet duct $u$ are omitted for clearness.

Figure 5:
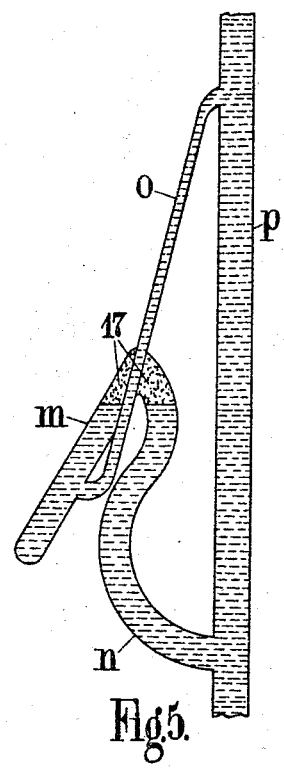
Figures 5 to 8 are explanatory sketches illustrating the method of free surface temperature control employed in Figures 3 and 4.
Figure 6:
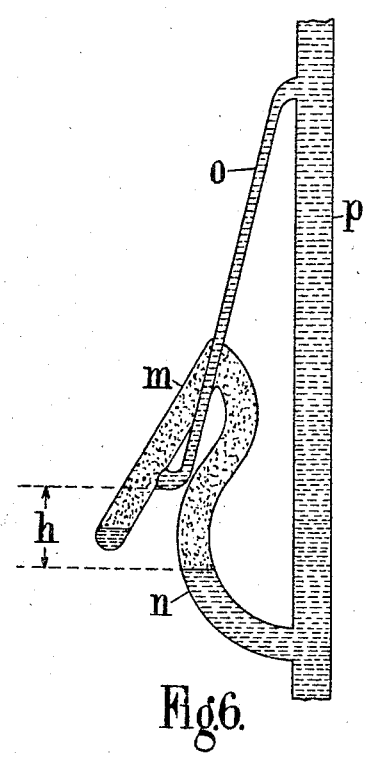
Figure 7:
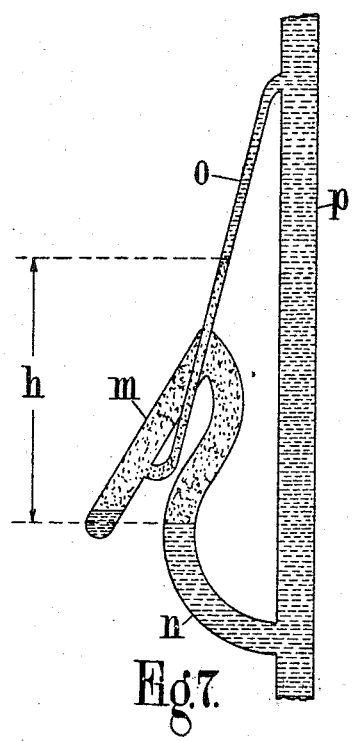
Figure 8:
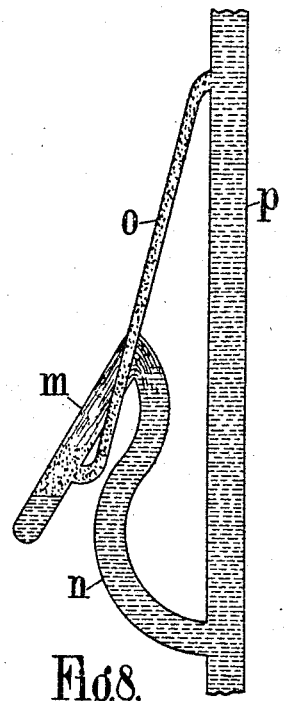

Referring to Figures 5–8 the action may be explained as follows:

Heat is continuously applied to the lower end of the tube $m$, the whole system being assumed to be full of, say, kerosene oil. Oil vapour commences to form at 17 (Figure 5) and the conditions represented in Figure 5 are produced, oil having been discharged from the upper end of $p$ corresponding to the volume of vapour so far generated in $m$ $n$.

The hydrostatic head supported by the vapour pressure of the oil is represented by $h$. As heating proceeds vapour enters the tube $o$ (of smaller cross-sectional area than $p$, $m$ or $n$) and is conveyed therethrough owing to the prevailing hydrostatic head which effects a clockwise circulation within the tubes $o$, $p$ and $n$. This circulation continues until the cool kerosene in the tube $n$ flows over the bent portion uniting the tube $n$ with the tube $m$. This causes a very rapid condensation of the vapour such that the whole space within the tubes $m$ and $n$ is completely filled with cool kerosene once more. Meanwhile the vapour in $o$ is condensed substantially simultaneously by contact with the cool free surface of the oil within the pipe p.

This condensing action effects a rapid inflow of cool kerosene to the tube m from the supply source resulting from relief of the hydrostatic head and is of such rapidity that the momentum of the column effects a flushing of the tubes n, m and o, thereby rendering extremely remote any chance of a stoppage due to foreign matter occurring in the tube o. This effect is facilitated by suitably shaping the inlet orifice y (Figure 3).

It will be noted that the fluid enters the tube u (Figure 3) in the vicinity of the said upper free surface which is produced and thus ensures that this region remains cool.

The vapour passing through the tube o may be allowed to bubble up through the liquid in the upper portion of the vertical tube p, the bubbles creating a number of free surfaces instead of a free surface in a horizontal plane.

One cycle of operations is now completed and in practice this cycle recurs automatically with regularity, the fluid fuel burner thus automatically causing the necessary fluid pressure, for its own operation to result entirely automatically and without the necessity for any initial pressure to start the burner.

In order to commence operations it is only necessary to apply heat to the closed end of the lower by-pass portion, when, as soon as the pumping action commences, the mixture entering the mantle 13 may be ignited.

The heat of the latter then maintains the pump in operation without further attention.

In order to fill the apparatus with oil initially the cock 16 is turned through half a revolution, thereby placing the ducts 7 and 11 in communication. A hand suction pump or other convenient device may now be applied to 11 and operated until filling is complete by means of fuel drawn in through the duct 10.

In order to extinguish the lamp it is merely necessary to turn the cock 16 so as to place the ducts 7 and 11 in communication with the atmosphere whereupon the small amount of fuel in the reservoir r flows out through 11 and the feed pressure is released.

It will be appreciated that the system will operate even with the fuel supply reservoir disposed at a level considerably below the level of the fuel nozzle outlet and furthermore that since the pipe connecting the duct 10 with the fuel supply reservoir is always under reduced pressure (below atmospheric pressure) there is no escape of oil in the event of a breakage or leakage in this pipe.

In some cases we may provide some convenient means for adjusting the quantity of oil pumped in unit time, e. g. a by-pass pipe connection between the reservoir r (Figure 3) and the duct 8, such connection including an adjustable spring-loaded valve.

It will be appreciated that according to the present invention the continuous application of heat, which may be derived from flame contact, radiation from an incandescent body or other suitable means, causes intermittent action in contradistinction to circulation such as obtains under the application of heat to ordinary vaporizing apparatus and the present invention comprehends means for generating pressure and ejecting part of the fluid contents of the apparatus and then automatically reducing pressure and recharging the generator with fluid, and these functions are carried out without requiring positively operated parts.

Having now described our invention, what we claim as new and desire to secure by Letters Patent is:—

1. A thermally actuated motive device including a liquid containing conduit, a non-return delivery valve at the top thereof, a non-return admission valve at the bottom thereof, a continuously heated inverted U-shaped conduit, the open end of one limb of which is connected to said former conduit at a point adjacent its lower end and above said admission valve and a conduit of smaller bore than that of said U-shaped conduit connected between the other limb thereof and a point adjacent the upper end of said first-mentioned conduit and below said delivery valve.

2. A thermally actuated motive device including a liquid containing conduit, a non-return delivery valve at the top thereof, a non-return admission valve at the bottom thereof, a continuously heated inverted U-shaped conduit, the open end of one limb of which is connected to said former conduit at a point adjacent its lower end and above said admission valve and a conduit of smaller bore than that of said U-shaped conduit connected between a point on the other limb thereof intermediate of the length of said limb and a point adjacent the upper end of said first-mentioned conduit below said delivery valve.

3. A thermally actuated motive device including a liquid containing conduit, a non-return delivery valve at the top thereof, a non-return admission valve at the bottom thereof, an inverted U-shaped conduit, the open end of one limb of which is connected to said former conduit at a point adjacent its lower end and above said admission valve and a conduit of smaller bore than that of said U-shaped conduit connected between the other limb thereof and a point adjacent the upper end of said first-mentioned conduit and below said delivery valve, and means for supplying heat continuously to the limb of said inverted U-shaped conduit which is associated with said conduit of smaller bore.

In testimony whereof we have signed our names to this specification.

CHARLES SCOTT-SNELL.
EDWARD SCOTT-SNELL.